N. FOSTER.
Fertilizer.

No 76,621.

Patented April 14, 1868.

Witnesses;

Inventor;

United States Patent Office.

NEWTON FOSTER, OF PALMYRA, NEW YORK.

Letters Patent No. 76,621, dated April 14, 1868.

IMPROVEMENT IN GUANO-DISTRIBUTER.

The Schedule referred to in these Letters Patent and making part of the same.

TO ALL WHOM IT MAY CONCERN:

Be it known that I, NEWTON FOSTER, of Palmyra, in the State of New York, have invented a new and useful Guano-Distributer; and I do hereby declare that the following is a full, clear, and exact description thereof, reference being had to the accompanying drawing, making part of this specification, in which—

Like letters of reference indicate corresponding parts.

Figure 1:
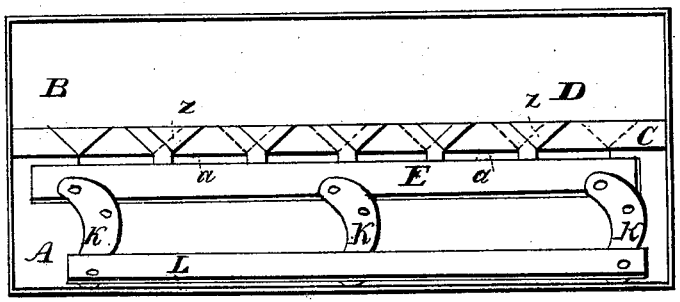
Figure 1 is a top view, showing the cut-off for varying the flow, and also the joints of the corrugated feeding-bar.
Figure 2:
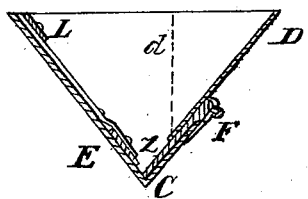
Figure 2 is a transverse section.

I make a box, having two sides, A and B, enclosed at both ends, in the shape shown in fig. 1. One side, B, is made in two parts, C D. The upper portion, D, in combined machines, may be placed as indicated by the dotted lines $d$, fig. 2.

Between the two parts, C and D, and upon the upper side of C, I place a bar, F, with a serrated edge, Z, the points of corrugation extending down to the angle formed by the two sides, said points reaching to the discharge-slots $a$, under the part D of the side B, and it is held in position by two metal straps attached to C and D.

On the side A, I place a cut-off, E, for the purpose of regulating the feed. This cut-off is bolted to two or more bent levers, K, which are pivoted at their angles, and connected together at the top by a bar, L.

The serrated plate may be reciprocated by any of the ordinary devices for working the distributing-apparatus in this class of machines.

The object of this invention is to provide a guano-spreader or distributer, that shall effectually deliver the material to be sown, and not clog.

I find that, by the arrangement set forth in my patent of January 13, 1863, for a broadcast seed and manure-sower, the feed-bar will not effect the discharge of guano, because the bar and distributing-fingers exposed within the box, the substance is constantly being reduced to a pasty condition, owing to its peculiar nature, which renders the machine wholly ineffectual for that purpose. I also find, by actual experiment, that when the feed-bar is made with V-shaped points, and they only presented to the material to be distributed, the discharge is effectually and satisfactorily performed.

What I claim as my invention, and desire to secure by Letters Patent, is—

As an improvement in machines for sowing fertilizers, the serrated-edged distributing-bar F, constructed as shown and described, and so arranged that the V-shaped teeth only of said bar shall be exposed to the material to be sown, substantially in the manner and for the purposes set forth.

NEWTON FOSTER.

Witnesses:
J. LORENZO GAGE,
WM. S. LOUGHBOROUGH.